United States Patent [19]
Harrison

[11] 3,896,953
[45] July 29, 1975

[54] METHOD OF LOADING ARTICLES ON A CONVEYOR

[75] Inventor: John Harrison, Lincolnwood, Ill.

[73] Assignee: The Spra-Con Company, Chicago, Ill.

[22] Filed: Oct. 4, 1973

[21] Appl. No.: 403,481

Related U.S. Application Data

[60] Division of Ser. No. 266,320, June 26, 1972, abandoned, which is a continuation of Ser. No. 45,174, June 9, 1970, abandoned.

[52] U.S. Cl.................. 214/152; 214/11 R; 198/38
[51] Int. Cl............................................ B65g 43/00
[58] Field of Search............. 214/11 R, 152; 198/38

[56] References Cited
UNITED STATES PATENTS

| | | | |
|---|---|---|---|
| 3,096,871 | 7/1963 | Anderson | 214/11 R X |
| 3,151,731 | 10/1964 | Harrison et al. | 214/11 R X |
| 3,164,271 | 1/1965 | McWilliams | 214/11 R X |
| 3,491,903 | 1/1970 | Hedick et al. | 214/11 R X |

FOREIGN PATENTS OR APPLICATIONS

| | | | |
|---|---|---|---|
| 41,253 | 6/1969 | Finland | 214/11 R |
| 67,840 | 8/1929 | Sweden | 214/11 R |

*Primary Examiner*—Robert J. Spar
*Assistant Examiner*—R. B. Johnson
*Attorney, Agent, or Firm*—McDougall, Hersh & Scott

[57] ABSTRACT

A system for loading articles on a conveyor wherein the conveyor is adapted to discharge the articles in selected discharge locations along the path of conveyor movement. The system includes a plurality of loading stations, each having an article transfer means operating to move articles at spaced intervals to an induction means. The induction means is positioned adjacent the conveyor, and the spaced intervals between articles on the transfer means are maintained so that the articles will be delivered to the conveyor at intervals corresponding to specific areas defined by the conveyor. A code is applied to the articles with the code being related to the conveyor area receiving the article and to a preselected discharge location so that an article will be automatically removed at the particular discharge location.

4 Claims, 11 Drawing Figures

METHOD OF LOADING ARTICLES ON A CONVEYOR

This is a division of application Ser. No. 266,320, filed June 26, 1972, now abandoned. Another divisional application Ser. No. 403,480, was filed Oct. 4, 1973, and continuation application Ser. No. 418,880 was filed Nov. 26, 1973. Application Ser. No. 226,320 was a continuation of application Ser. No. 45,174, filed on June 9, 1970, now abandoned.

This invention relates to means for use in transferring articles from loading stations onto a moving conveyor. In particular, the invention is concerned with a system which permits coding of articles prior to transfer onto a conveyor with the coding and transferring being carried out in a manner such that the conveyor can move at high speed.

The system of this invention will be particularly described with reference to conveyor constructions which include automatic article discharging systems. Such systems usually comprise endless conveyors moving adjacent to a plurality of discharge stations located along the conveyor path. Articles are placed on the conveyor at a loading station and suitable coding means are actuated. The codes are related to the articles in a manner such that each article will be automatically discharged when it arrives at a selected one of the discharge locations. A variety of systems of this type are described in the prior art, for example as set forth in Speaker U.S. Pat. No. 3,034,665.

The conveyor constructions described in the Speaker patent comprise individual trays which carry articles to be discharged at various locations. When an article is placed on a tray, a code is assigned to the article, and the tray is adapted to automatically discharge the article in accordance with the pre-assigned code. Systems which include article carrying means other than trays have similar coding and discharge capabilities.

Problems arise with respect to the techniques employed for loading articles onto the individual trays or other conveyor means. Attempts have been made to provide for manual loading of articles; however, this technique is unsatisfactory since it severely limits the speed of conveyor movement. Thus, it is too difficult for even relatively skilled persons to apply a code and load an article on a tray carrying that code unless the conveyor is moving at a relatively low speed.

Mechanical means have been proposed for loading articles onto moving conveyors. Systems are described, for example in Harrison, et al. U.S. Pat. Nos. 3,333,677 and 3,339,699. These systems provide a table located above the path of conveyor movement with means being provided for sweeping articles off the table and onto moving conveyor trays. In other systems, mechanical loading means are situated at the side of a conveyor, and articles are then thrown onto conveyor trays.

It is a general object of this invention to provide improvements in means for loading articles onto moving conveyors.

It is a more specific object of this invention to provide a system which involves maximum use of individuals handling coding means and maximum operating speed and efficiency from the standpoint of the loading mechanisms and conveyor operation.

These and other objects of this invention will appear hereinafter, and for purposes of illustration, but not of limitation, specific embodiments of the invention are shown in the accompanying drawings in which:

FIG. 1-a is a plan view of a section of an article loading station characterized by the features of this invention;

FIG. 1-b is a plan view of the remaining portion of the article loading station;

FIG. 2-a is a side elevation of the loading station section shown in FIG. 1-a;

FIG. 2-b is a side elevation of the loading station section shown in FIG. 1-b;

The system of this invention is used in conjunction with a conveyor having a plurality of article carrying areas, for example, a plurality of trays. In usual operation of such conveyors, a plurality of discharge locations are situated along the path of conveyor movement, and means are provided for removing articles from the conveyor when the articles reach preselected discharge locations.

The structure of this invention involves the use of a plurality of loading stations situated at spaced-apart locations along the path of conveyor movement. Each loading station includes an article transfer means, and means for controlling movement of articles on the transfer means so that the articles will be positioned at spaced intervals on the transfer means. An induction means is situated for receiving articles from the transfer means, and for loading articles onto the conveyor. The spaced intervals between articles on the transfer means are such that the articles will be delivered to the induction means in timed relationship to the movement of the conveyor trays or other article carrying areas moving past the induction means. Accordingly, the articles will be delivered to the induction means when a conveyor area is in position for receiving an article.

The loading system preferably includes an arrangement for coding articles prior to placement of the articles on the transfer means. A plurality of coding stations may be utilized with each station being related to particular conveyor areas. A delivery belt or other means may be employed for moving articles onto the transfer means. Operation of the delivery belt will then be dependent on movement into position of a conveyor tray which is assigned to the coding station involved. When this conveyor tray has actuated means for operating the delivery belt, the transfer means then operates to keep the article in proper relationship with the particular tray so that the article will be moved onto that tray by the induction means. If a code is assigned to the article when it is placed on the delivery belt, the code transfer can then be relayed to that same tray so that the discharge means for that tray can be operated at the proper time.

The drawings illustrate a system which includes a conveyor 10 having a plurality of trays which serve as article carrying means. The conveyor trays illustrated are of the type described in Harrison application Ser. No. 816,493, filed on Apr. 16, 1969. The aforementioned Speaker patent also described a conveyor system including a plurality of trays which may be adapted for use in accordance with the concepts of this invention. It will be understood however, that various aspects of this invention are applicable to a wide variety of conveyor systems.

Figure 1A:
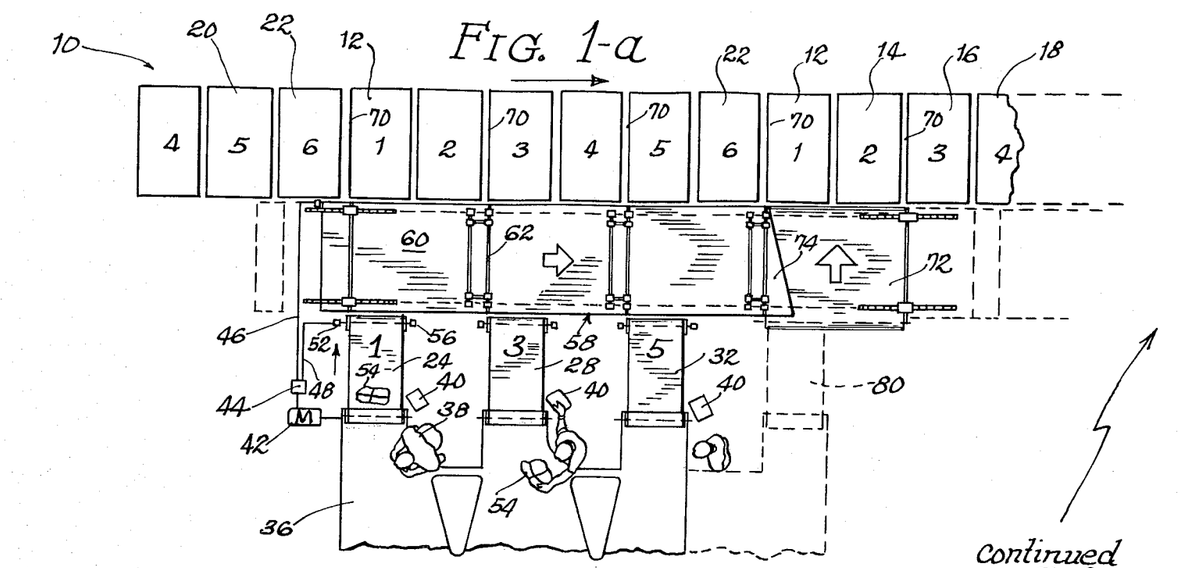
Figure 1B:
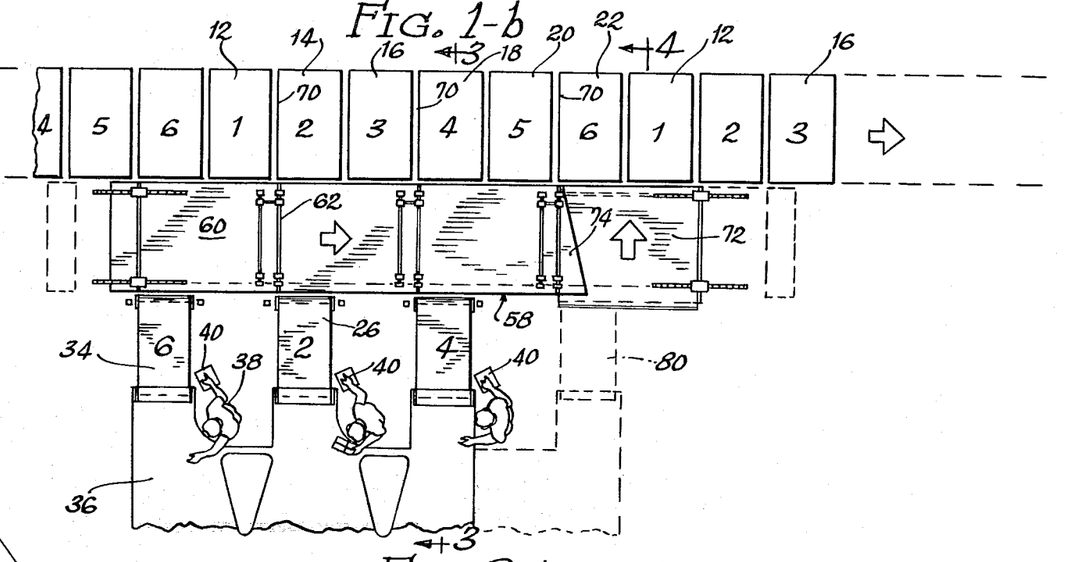
Figure 2A:
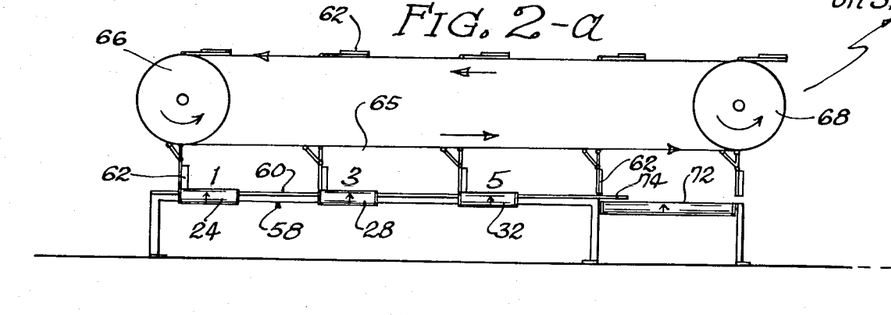
Figure 2B:
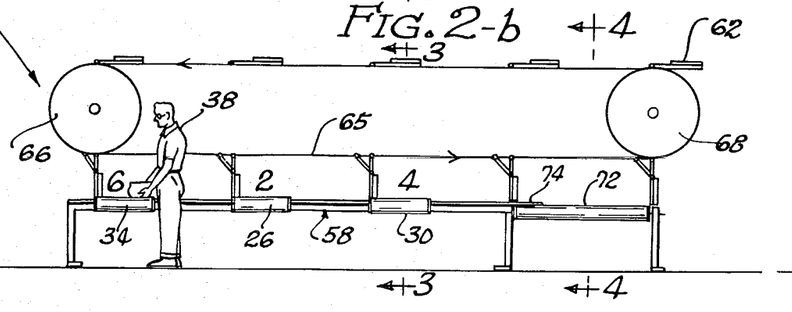

As shown in FIGS. 1-a and 1-b, the individual conveyor trays are assigned different numbers. The trays 12 are designated No. 1, 14 No. 2, 16 No. 3, 18 No. 4, 20 No. 5 and 22 No. 6. The numbering of the trays corresponds with the numbering assigned to the coding stations. Thus, corresponding numbers are shown on the delivery belts 24–34. It will be appreciated after considering the following description that the number of coding stations can vary, and that particular trays will be assigned depending upon the number of coding stations involved.

The coding stations are provided with tables 36 for supporting articles. Individuals 38 are situated at these tables so that the desired destination of the articles can be determined. If the over-all system is designed for sorting articles, for example in a post office operation, then the persons at the coding stations will visually determine the destination of the articles. Thus, a particular discharge location along the conveyor path may be designated for receiving all articles which are addressed to a particular city or zip code number. The code to be applied by these persons will depend upon such designations.

A coding console 40 is situated at each station, and this coding means is operated as each article is placed on the adjacent delivery belt.

The delivery belts 24–34 preferably have a two-speed drive means associated therewith. In FIG. 1-a, the delivery belt 24 is driven by motor 42. A speed control device 44 is associated with this motor, and lines 46 and 48 provide input for the control means.

The line 46 extends to a switch 50 positioned adjacent the path of conveyor movement. The line 48 is connected to photocell 52.

In the example illustrated, the motor 42 is adapted to normally operate at a relatively low speed. When an article 54 is placed on the belt 24, the article will be moved by the belt to a position opposite the light source 56. At this point, the light beam is interrupted, and control means 44 then operates to shut off the motor 42.

Each of the trays in the conveyor construction is provided with switch actuating means. Where mechanical switches are employed, the actuating means may comprise arms which extend outwardly for engagement with switches located adjacent the loading station. Each of the trays 12 through 22 will have an arm in a different position, and each of the switches for the respective coding stations will be in a different position so that each tray will only actuate one particular switch. In the example shown in FIG. 1-a, the arm associated with each tray 12 (the 1 trays) will engage the switch 50. The trays 14 through 22 do not carry any means for engaging the switch 50 but each of these trays will carry a means for engaging a switch located at the coding station having the same numerical designation. Thus, each of the No. 3 trays will engage a switch positioned opposite the No. 3 coding station, etc.

The control means 44 operates to energize the motor 42 for high speed operation when the switch 50 is engaged. This high speed operation is sufficient to move the article 54 onto the transfer table 58. This transferring movement preferably takes place when a No. 1 tray 12 is positioned opposite the No. 1 coding station. Depending upon the position of the switch 50 and the nature of the switch actuating means associated with the tray 12, time delay may be incorporated between the engagement of the switch 50 and the high speed operation of the belt 24. It will be apparent that with the mechanisms described, the movement of an article from the belt 24 to the transfer table 58 can be synchronized with the position of a No. 1 tray 12.

Instead of using mechanical switches, the system can be programmed so that a signal will be sent to the respective control means 44 whenever trays are in proper alignment. Thus, signals will be sent to the control means in synchronized relationship with the tray movement, and the respective motors 42 will operate whenever an article is detected by the electric eye or other detecting means.

Figure 3:
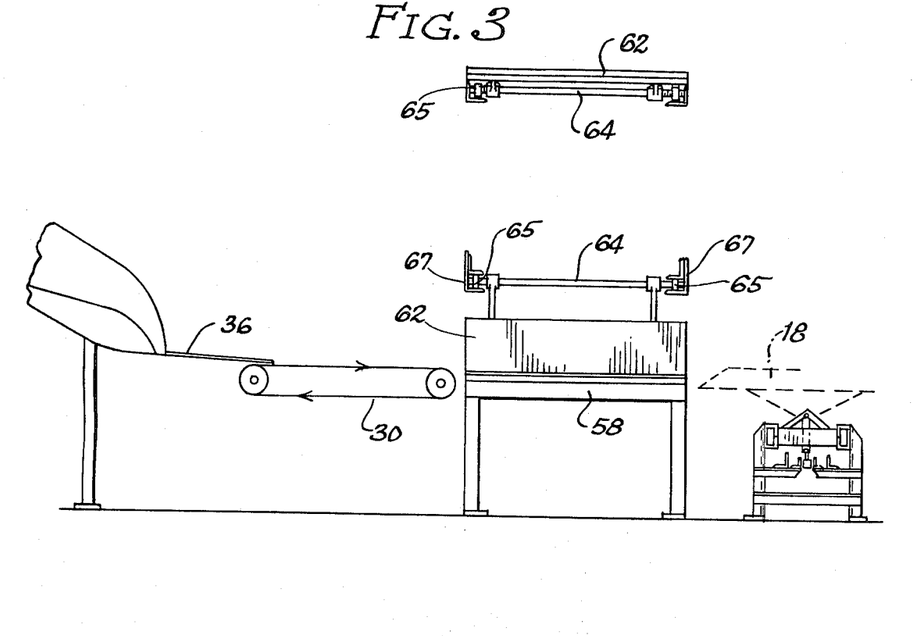
FIG. 3 is a cross-sectional view taken about the line 3—3 of FIG. 1-b.
Figure 4:
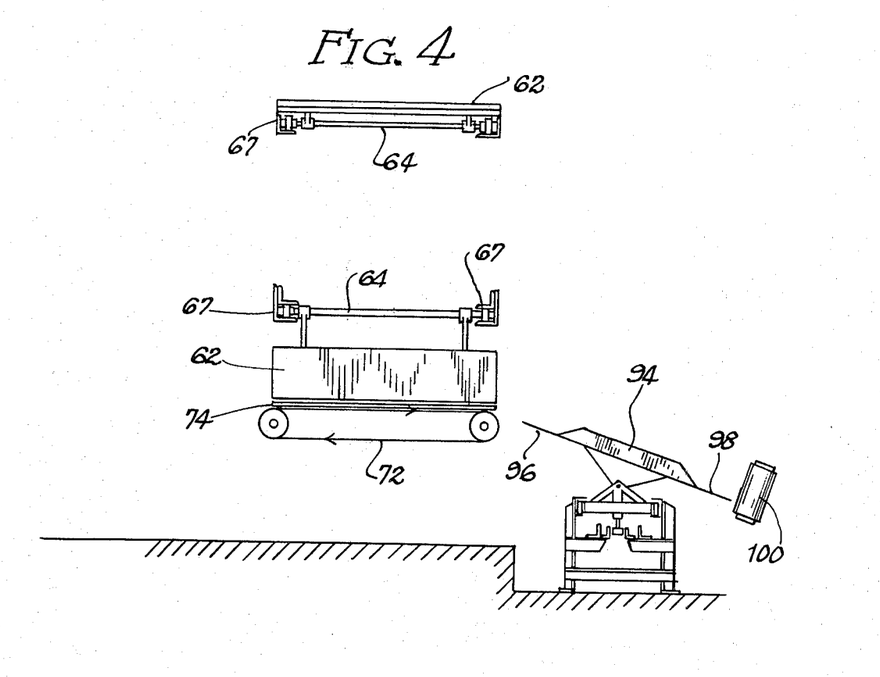
FIG. 4 is a cross-sectional view taken about the line 4—4 of FIG. 1-b.
Figure 5:
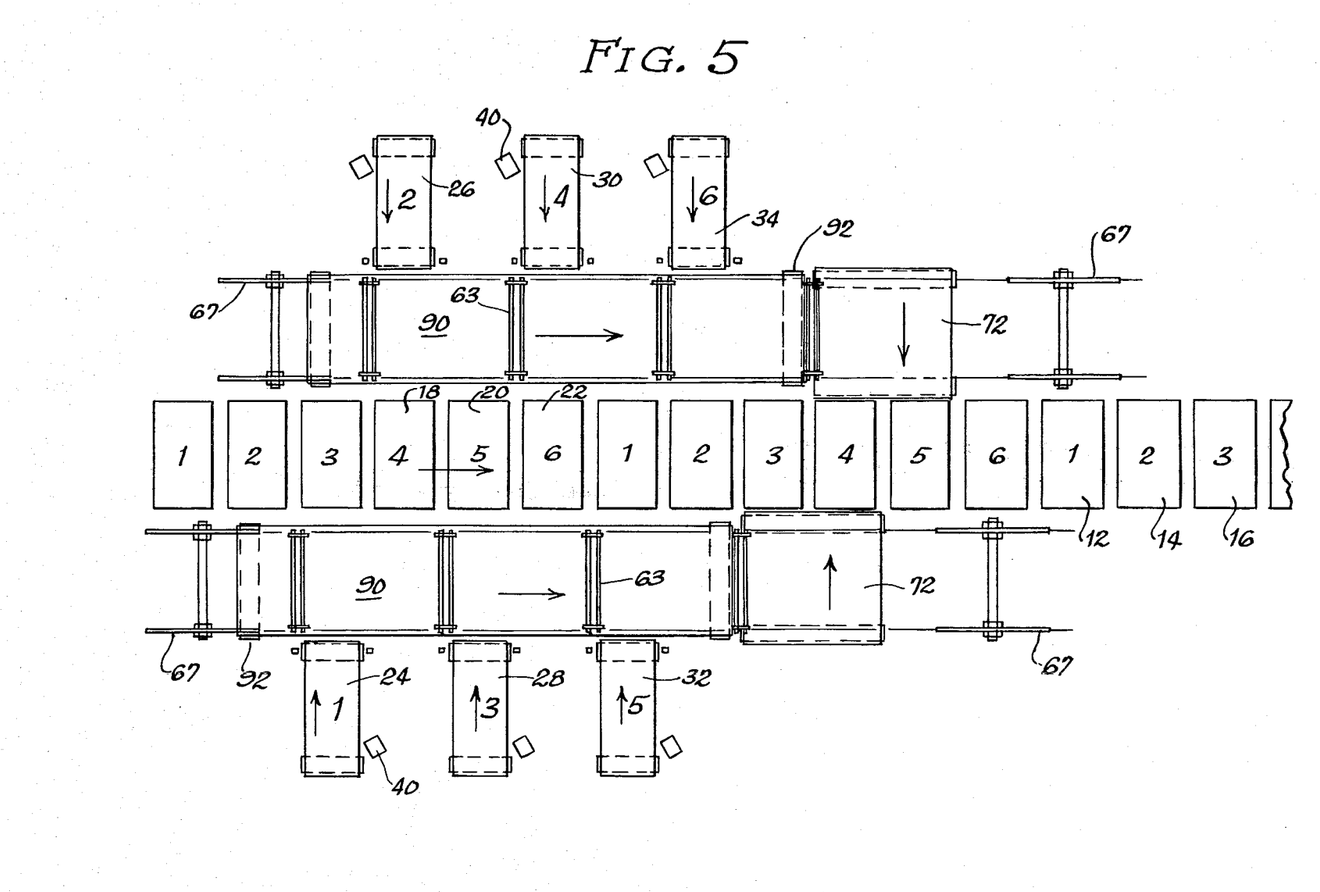
FIG. 5 is a plan view of an article loading station comprising an alternative form of the invention.

The transfer table 58 defines an upper bed 60, and a plurality of paddles 62 are adapted to continuously sweep across the bed 60. As shown in FIGS. 3, 4 and 5, the paddles 62 are pivotally secured to transverse rods 64 which are tied to chains 65. The chains are supported by tracks 67 and they are driven by means of sprockets 66 and 68. In the embodiment shown, the paddles 62 will lie flat when moving along the top flight of the chains while hanging downwardly when moving along the lower flight.

The paddles 62 serve as pusher means for articles located on the bed 60. Thus, when an article is moved from a delivery belt 24 onto the bed 60, one of the paddles 62 will engage the article and push the article from left to right over the bed 60. The position of the paddles 62 on the belt 64 is determined by the position of the conveyor trays. It will be noted that in FIG. 1-a, the engaging face of the paddles is located in line with the trailing edge 70 of one of the trays No. 1, No. 3, and No. 5. Accordingly, when a delivery belt 24 moves an article onto the bed 60, the paddle which engages that article will be in line with the trailing edge of a No. 1 tray. Similarly, articles delivered from the belts 28 and 32 will engage paddles which are lined up with the trays 16 and 20. Referring to FIG. 1-b, the trailing edges 70 of the trays No. 2, No. 4 and No. 6 are similarly aligned with paddles 62. It will be appreciated that variations in the relative positions of the engaging faces of the paddles and the trailing edges of the trays may be made depending on factors such as conveyor speed and delivery belt speed.

Figure 7:
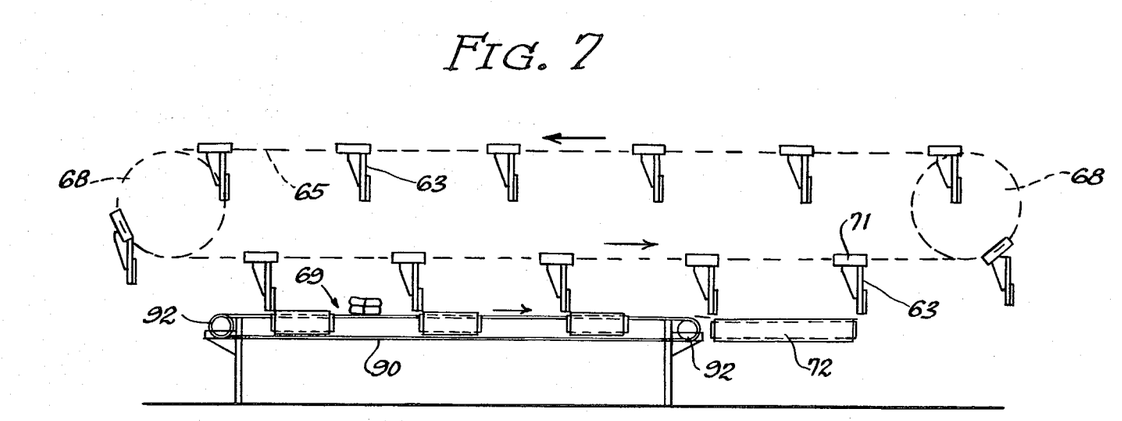
FIG. 7 is a side elevation of an alternative arrangement for a transfer construction.
Figure 8:
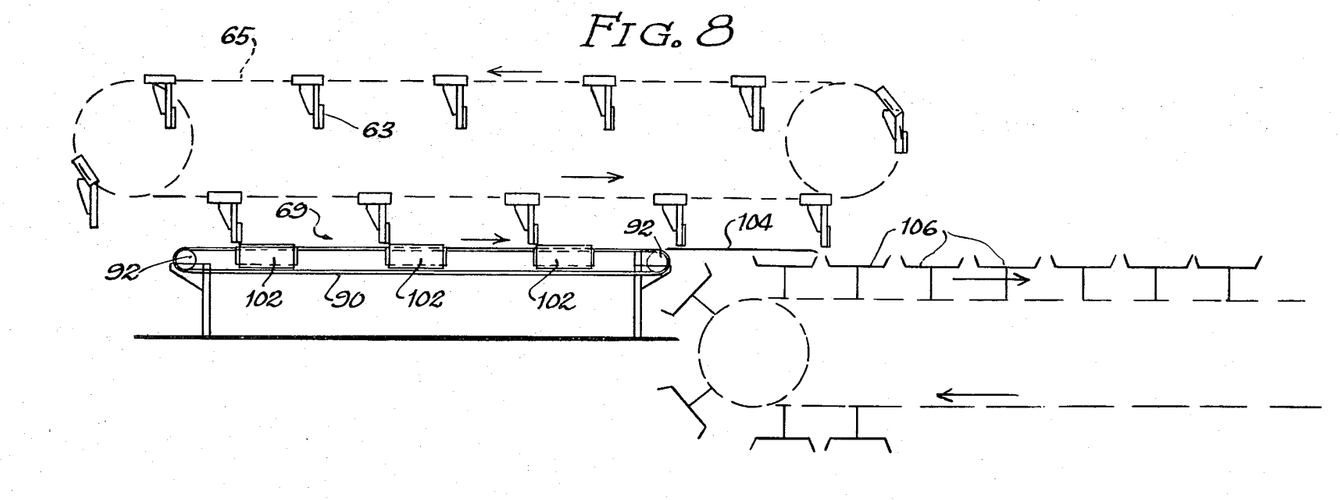
FIG. 8 is a side elevation of the transfer construction illustrated in FIG. 6; and, FIG. 9 is a circuit diagram illustrating one means for accomplishing code transfer in a system of the type described.

FIGS. 7 and 8 illustrate an alternative form of the invention wherein paddles 63 are suspended from a drive chain or other conveyor supporting means 65. The conveyor extends over sprockets 68, one of which may be driven for movement of the paddles relative to the transfer bed 69. The paddles 63 are pivotally suspended from blocks 71 attached to the conveyor. With this arrangement, the paddles always hang vertically downwardly which has safety advantages for high speed operation. Thus, the paddles will not swing through 360° as is the case with the paddles 62 and, therefore, the chances of a workman being injured are reduced.

At the end of each table 58, there is provided an induction means 72 running perpendicular to the sorting conveyor. This induction means may comprise a continuously moving belt adapted to move articles from the induction means onto one of the trays. Since the paddles 62 keep articles on the transfer table in alignment with a particular tray, the induction means will serve to transfer each article onto its designated tray as each article reaches the end of the induction means. In the example shown in FIG. 1-a, a package 54 is located in place on the conveyor 24. By the time this article reaches the beam from light source 56, No. 1 tray 12 opposite the No. 1 code station will have moved by. Accordingly, the article will sit in position at the end of the belt 24 until the next No. 1 tray operates the switch 50. When the article is then transferred onto the table 58 due to high speed operation of the belt 24, the article will be in alignment with a No. 1 tray. Due to the action of the paddle 62, this same No. 1 tray will be in alignment with the article when the article reaches the induction belt 72.

The belt 72 preferably has a substantial width (the dimension in the direction of tray movement) whereby articles will move across the width of the belt while at the same time being directed toward the conveyor trays. It will be noted that the paddles 62 continue to engage the articles even after movement onto the belt 72. Thus, these articles are maintained in accurate alignment with a designated tray up until the moment of transfer to the tray. The width of the belt is preferably extensive since this will allow for slower speeds for the belt 72 in the direction of movement toward the trays. Gentler transfer can, therefore, be accomplished without in any way reducing the speed of conveyor movement and the corresponding speed of the paddles.

It is desirable to maintain the articles in engagement with the paddles while the articles are on the belt 72, and means may be incorporated to insure this, particularly in the case of articles which would tend to roll away from the paddles. The belt 72 could, for example, be constructed of a plurality of individual chains or small endless belts located in side-by-side relationship and having a component of movement opposing the movement of the paddles. Referring to FIGS. 1-a and 1-b, the individual endless conveyors could be aligned at the same angle as the edge of the end portion 74 to thereby provide the desired opposing component of movement.

The transfer bed 58 preferably includes an angular end portion 74 which extends over a portion of the induction belt 72. With this arrangement, only one corner of an article will initially be engaged by the belt 72. This corner of the article will be well onto the belt 72 before there is engagement all across the leading side of the article. If the entire leading side of an article is engaged simultaneously by the induction belt, particularly in the case of articles irregularly loaded or relatively long articles, having their center of gravity off center with the heavier end being the leading end, the belt will tend to very quickly move the leading side of the article toward a conveyor tray. This will move the leading portion of the article too quickly in cases where a substantial portion of the length of the article is still on the table 58. If such long articles are turned at a relatively severe angle, a jam could occur. The use of the slanted end extending over the surface of the induction belt 72 limits the amount of initial engagement of the article by the belt tending to keep the article in alignment.

As illustrated in FIGS. 7 and 8, the transfer bed 69 may comprise a conveyor belt 90 mounted on rollers 92 and driven in the direction of movement of the paddles 63. With this arrangement, however, the speed of movement of the belt 90 is preferably less than the speed of movement of the paddles. This arrangement will serve to maintain the articles in engagement with the paddle faces which, particularly in the case of articles which might tend to roll, serves to maintain alignment of the articles with designated conveyor trays. The belt 90 may be driven through the use of the conveyor drive means, for example by using reduction gears, which maintain the speed of the belt 90 at a level of 80 percent of the speed of the conveyor. The paddles 63 will, of course, move at the same speed as the conveyor.

The articles discharged from an induction means such as the belt 72 may be placed on conveyor trays which are horizontally disposed. As shown in FIG. 4, conveyor trays 94 may be located in a tilted position when receiving articles. The use of tilted conveyor trays provides definite advantages as described in copending application Ser. No. 816,493 and U.S. Pat. No. 3,463,298, and this arrangement is particularly advantageous in the system of this invention. The tilting conveyor trays 94 are preferably provided with pivotally mounted gates 96 and 98 as described in the above mentioned application and patent. The gate opposite the induction means may be closed to prevent an article from falling off a tray, however, a belt 100 may alternatively be employed during the loading operation. This belt extends transversely along the conveyor path and moves in the direction of conveyor movement to thereby hold articles in position on a tilted tray until the tray has been returned to the horizontal position.

Figure 6:
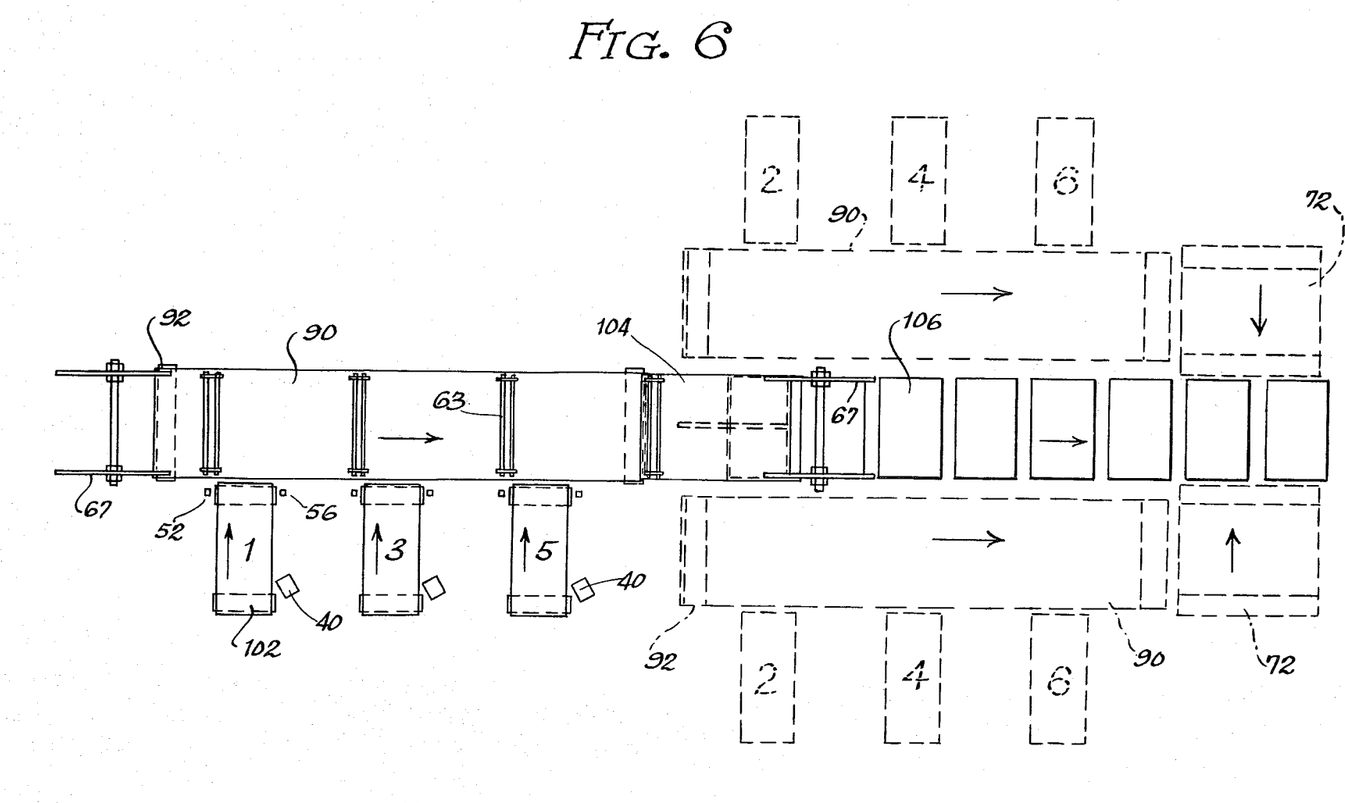
FIG. 6 is a plan view of an article loading station comprising a further alternative form of the invention.

In the arrangements described in FIGS. 1-a through 4, the articles are placed on an induction means such as a belt 72 which is located at the side of the conveyor trays. FIGS. 6 and 8 illustrate an alternative arrangement wherein the conveyor 65 for paddles 63 moves in a path directly in line with the path of conveyor movement. The articles are moved onto the belt 90 by means of delivery belts 102 in essentially the same phase as previously described. In this case, however, articles on the belt 90 are moved to an induction bed 104, and from this bed the paddles 63 push the articles onto the conveyor trays 106.

The "in line arrangement" shown in FIGS. 6 and 8 will serve to deposit articles on every other tray of the conveyor. In order to accommodate every tray, one induction arrangement such as described in FIGS. 1 through 4 may, as illustrated, be located on either side of the conveyor.

The coding system employed in conjunction with the loading arrangement described may be any conventional type. One system is described in the aforementioned Speaker patent. A preferred arrangement is described in copending application Ser. No. 3,930, filed Jan. 19, 1970, which comprises a highly efficient means for providing automatic discharge of articles loaded onto a moving conveyor from a loading station having associated coding means.

Figure 9:
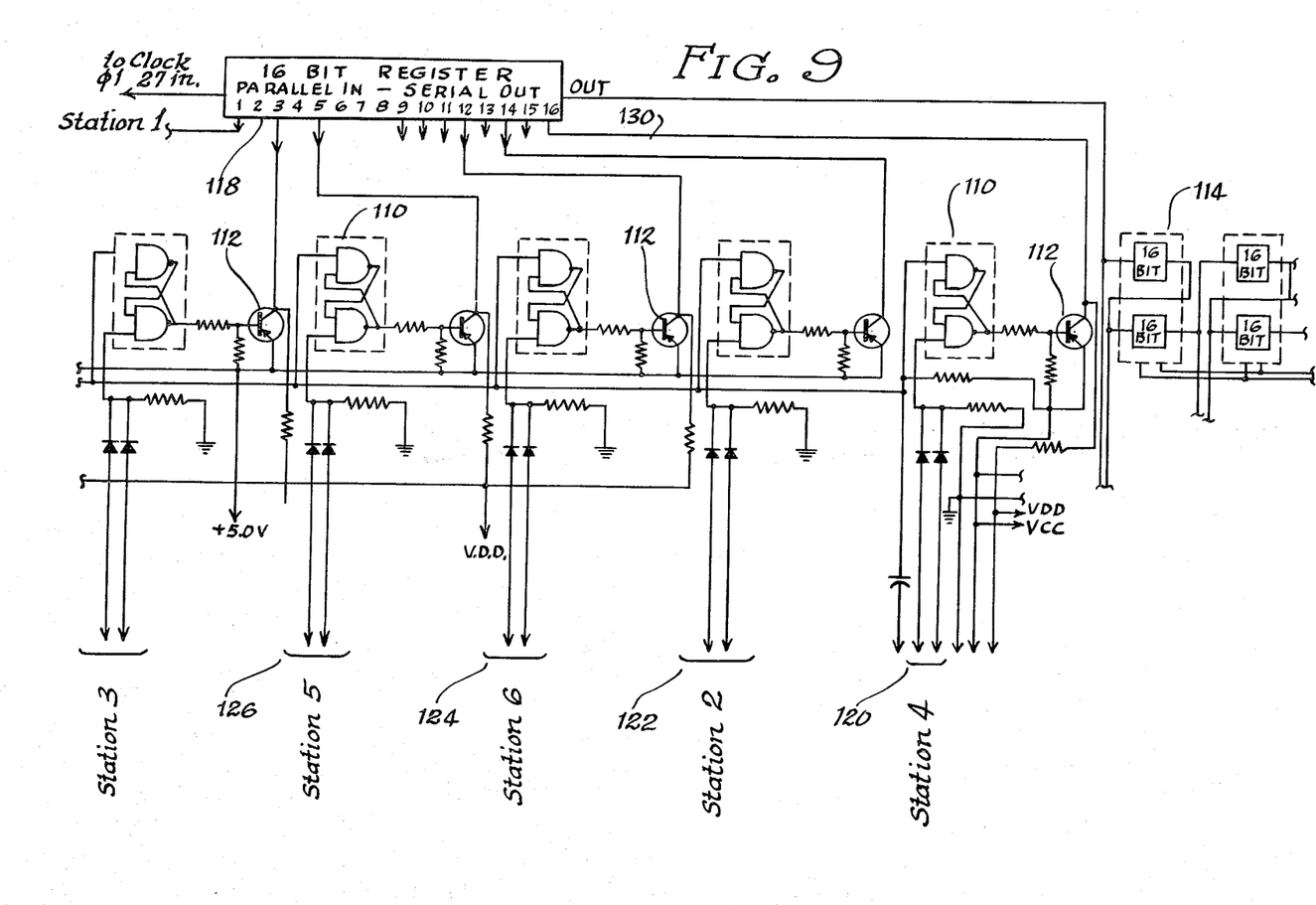

FIG. 9 illustrates the manner in which the coding system described in application Ser. No. 3,930 can be adapted for use in the system of this invention. The structure illustrated in FIG. 9 comprises the input portion of a read output module, which, as described in that application, is associated with a particular discharge location whereby a solenoid or other actuating means will operate when a particular tray arrives to thereby achieve discharge of an article from the tray.

The read output module operates when a flip-flop 110 is activated thereby sending a pulse through an associated transistor 112. Where, as in Ser. No. 3,930, a read output module is connected to a single coding station, then a single flip-flop and transistor is provided with the output thereof being transmitted to a register 114 whenever an article is to be discharged at the discharge station for the particular module.

In accordance with this invention, a single module is connected to a plurality of coding stations. Thus, in the example illustrated, articles from each of the six stations could be designated for the same discharge location and, therefore, the read output module for that location must be set for activation by each coding station.

To accomplish this, an additional register 118 is connected between the transistors 112 and registers 114. Separate inputs to the individual flip flops 110 are provided for each coding station. Referring to FIGS. 1-*a* and 1-*b*, the input 120 applies to station 4; the input 122 to station 2; the input 124 to station 6; and the input 126 to station 5. When a signal is received from station 4, the signal from the associated transistor 112 is applied to the line 130 which is attached to the end terminal of the register 118 whereby an immediate signal will be transmitted to the registers 114. When a signal from coding station 2 is transmitted, the signal to the register 118 is applied to the No. 14 terminal whereby two additional clock pulses are required before an output signal is applied to the register 114. In this way, the relative positions of the coding stations 4 and 2 are taken into account. Thus, the time delay required for the additional clock pulses will, as explained in application Ser. No. 3,930, cause the signal applied to the registers 114 to be delayed until the tray 2 is in position for receiving an article. The other connections to the register 118 are similarly selected, depending upon the relative physical positions of the coding stations so that counting for a read output module will begin when an article is transferred to a tray irrespective of the coding station from which the article came.

The particular arrangement of coding stations illustrated in the drawings illustrates the efficiency of a system incorporating the features of this invention. In this system, two loading stations are each provided with three separate coding stations whereby six operators can be employed at the same time. If the system is utilized to maximum advantage, all six operators will be placing packages or other articles on an adjacent delivery belt. Thus, all six delivery belts will be moving packages onto one of the transfer tables 58. This movement of articles onto the transfer tables is precisely controlled due to the fact that a delivery belt for a particular coding station can only operate when a tray having the same numerical designation is in a designated position. The relative positions of the trays and articles from a corresponding station are then maintained by the pusher means 62. This arrangement permits operation of the conveyor system at speeds of up to six times the operating speed of an individual at a coding station. Obviously, this ratio could be increased by increasing the number of coding stations.

The use of pusher means of the type described is advantageous since the endless chain or other conveyor means supporting the pusher means can be tied to the main conveyor drive system. Once the pusher means 62 have been set in position relative to the trailing edge of a tray, then the pusher means will remain in this same relationship as long as the same drive means is used irrespective of changes in conveyor speed.

In the embodiments illustrated, the pusher means 62 associated with one transfer table are aligned with the trailing edge of every other tray, these trays being in a set designated either by even numbers or odd numbers. Thus, the spacing between the engaging surfaces of adjacent pusher means is equal to the distance between the center points of the alternating even numbered or odd numbered trays. Similarly, the distance between center lines of adjacent belts in a group of belts associated with a particular transfer table is equal to the distance between center points of the even numbered or odd numbered trays. With the use of two groups of delivery belts, all trays can be accommodated by offsetting the pusher means in one group relative to the pusher means of the other group so that the pusher means will accommodate either the odd numbered or even numbered trays.

A division of the trays into sets with each set including every other tray is not a limiting factor of the invention. Thus, three or more sets could be employed in association with a corresponding number of loading stations each having pusher means which are related to trays of a given set.

In addition to using a coding arrangement for each article handled, the conveyor system could be used simply as a means for rapid delivery of articles to separate conveyor areas, for example where it is desired to carry articles in equally spaced relationship at high speed along a conveyor. In the illustrated system, a separate delivery belt 80 may be employed for delivering articles directly to the induction belts 72 where delivery of an article to a particular tray is not of any concern. This arrangement might, for example, be used during low-volume periods of operation where it would be uneconomical to run all of the endless belts and the pusher means constructions.

The delivery belt 80 may also be used as an intermediate loading station by locating a sensing means near the end of the bed 60. This sensing means may be used to determine if a particular pusher does not have an article associated therewith. This could happen if an operator is delayed for some reason at a particular station. In such case, the sensing means can activate the mechanisms for the belt 80 to move a package onto the induction belt 72 whereby maximum utilization of the system can be accomplished.

The particular division of coding stations wherein all odd numbered stations are at one loading location and all even numbered stations at another, adds to the efficiency of the operation. This permits separation of the pusher means 62 by a distance equal to the width of two conveyor trays. Accordingly, a relatively large opening is provided for transferring an article from a delivery belt onto a table 58 so that the pusher means 62 can move at relatively high speed without interfering with this delivery operation. Similarly, the induction belts 72 will, at the maximum, deliver articles to every other tray.

The basic system of the invention has extensive versatility depending upon the physical space requirements. As illustrated in FIG. 5, for example, the loading locations described in FIGS. 1-a and 1-b could be located on opposite sides of the conveyor. In this instance, the delivery belts of the respective stations are located in staggered relationship. Obviously, other physical arrangements are possible depending upon the availability of space in the particular area being used, and depending upon the particular requirements for the installation.

The pusher means 62 and 63 should be designed so that the articles being handled will not be damaged. A resilient strip could, for example, be provided on the face of the pusher means to minimize the possibility of impact damage. This strip could extend down into engagement with the transfer bed so that a seal will be provided to prevent portions of an article such as the string on a package, from becoming caught between the pusher and the bed. The pusher could comprise a pair of such resilient means mounted in spaced relationship, one behind the other, to thereby provide a second barrier for preventing strings or the like from being caught.

It will be understood that various changes and modifications may be made in the above described construction which provide the characteristics of this invention without departing from the spirit thereof.

That which is claimed is:

1. In a method for conveying articles from one position to another including a conveyor, a plurality of separate, individually defined, article carrying areas defined by the conveyor, a plurality of loading stations, a plurality of article transfer means positioned for receiving articles from loading stations, said transfer means including an article supporting surface, and article engaging means for contacting the articles and for moving the articles along the supporting surface to a transfer position for movement thereat of the articles from the supporting surface to the article carrying areas of the conveyor, said method comprising the steps of:
   a. locating said loading stations in at least two groups and positioning each group at a separate location relative to each other group, each group including at least two loading stations;
   b. transferring articles from each loading station to a specific position on a transfer means whereby each loading station transfers articles to a different surface portion of a transfer means;
   c. moving said article engaging means over said surfaces of said transfer means at the same speed as said article carrying areas of said conveyor whereby each article placed on the transfer means is moved by an article engaging means at the same speed as an article carrying area;
   d. said article carrying areas being divided into sets with each set receiving articles from a particular group of loading stations, and locating the article carrying areas designated for the loading stations of one group in regular, alternating positions with respect to article carrying areas designated for loading stations of each other group;
   e. controlling the spacing between article engaging means for each transfer means to a distance substantially equal to the spacing between center points of succeeding article carrying areas in a set whereby said spacing between article engaging means is at least about equal to or greater than the distance between center points of the first and third areas of a group of three adjacent article carrying areas;
   f. moving the article engaging means associated with one group of loading stations whereby articles passed from each loading station of that group are moved in synchronized timed relationship only with respect to article carrying areas designated for that group; and,
   g. aligning each article engaging means of a group with a particular article carrying area designated for that group whereby each article engaging means is in a pair with a particular article carrying area with the respective members of each pair arriving substantially simultaneously at the transfer point whereby articles moved by the article engaging means for that group are moved only to article carrying areas in the set designated for loading stations in that group.

2. A method for loading articles on a conveyor wherein the conveyor comprises a plurality of separate, individually defined, article carrying areas, and wherein a plurality of article transfer means are positioned for receiving articles from loading stations, each of said transfer means defining a separate article supporting surface and having separate means for moving articles, and a transfer location for each transfer means whereat the articles are moved from the supporting surface to the article carrying areas of the conveyor, said method comprising the steps of providing pushers as said means for moving said articles, a separate set of pushers being provided for each transfer means, moving each pusher in synchronism with a particular article carrying area, so that each pusher, upon engagement with an article, is moved to a transfer location for arrival at the same time as its particular article carrying area whereby each pusher will only engage articles which are to be moved onto a particular article carrying area, spacing said pushers apart by a distance equal to at least twice the width of an article carrying area, placing articles on said transfer means by means of said loading stations, and synchronizing the movement of pushers in one set with the movement of article carrying areas which alternate with other article carrying areas, the movement of said other article carrying areas being synchronized with pushers of another set, the pushers for a first transfer means thereby moving articles only onto article carrying areas skipped by the pushers of a second transfer means.

3. A method in accordance with claim 1 wherein an induction means is located at said transfer point, each article engaging means moving articles onto the induction means, and including the step of operating the induction means to move each article to the article carrying area comprising the member of a pair with a particular article engaging means.

4. A method in accordance with claim 3 including the step of employing pushers as said article engaging means.

* * * * *